US009136066B2

(12) United States Patent
Anouti et al.

(10) Patent No.: US 9,136,066 B2
(45) Date of Patent: Sep. 15, 2015

(54) METHOD FOR ASSEMBLING A HYBRID LITHIUM SUPERCAPACITOR

(75) Inventors: Meriem Anouti, Saint Avertin (FR); Daniel Lemordant, Vouvray (FR); Grzegorz Lota, Poznan (PL); Celine Moueza-Decaux, Orleans (FR); Encarnacion Raymundo-Pinero, Orleans (FR); Francois Beguin, Olivet (FR); Philippe Azais, Saint Egreve (FR)

(73) Assignees: Blue Solutions, Odet (FR); Centre National De La Recherche Scientifique, Paris (FR)

( * ) Notice: Subject to any disclaimer, the term of this patent is extended or adjusted under 35 U.S.C. 154(b) by 53 days.

(21) Appl. No.: 14/119,570

(22) PCT Filed: Apr. 17, 2012

(86) PCT No.: PCT/FR2012/050837
§ 371 (c)(1),
(2), (4) Date: Jun. 12, 2014

(87) PCT Pub. No.: WO2012/172211
PCT Pub. Date: Dec. 20, 2012

(65) Prior Publication Data
US 2014/0325807 A1 Nov. 6, 2014

(30) Foreign Application Priority Data

Jun. 9, 2011 (FR) ...................................... 11 55048

(51) Int. Cl.
H01L 21/76 (2006.01)
H01G 11/84 (2013.01)
H01G 11/62 (2013.01)

(52) U.S. Cl.
CPC ............... *H01G 11/84* (2013.01); *H01G 11/62* (2013.01); *Y02E 60/13* (2013.01); *Y10T 29/417* (2015.01)

(58) Field of Classification Search
CPC .............. H01L 51/102; H01L 51/0045; H01L 51/0006; H01L 28/40; H01L 28/60; H01L 21/0495; H01L 21/048; H01L 21/02527; H01L 21/02348; H01L 21/0231; H01L 21/02307; H01L 21/02126
USPC ......... 438/408, 238, 381, 253, 257, 258, 266, 438/267, 289, 396; 257/E21.006, E21.007, 257/E21.008, E21.064, E21.173, E21.215, 257/E21.485
See application file for complete search history.

(56) References Cited

U.S. PATENT DOCUMENTS 8,114,469 B2 * 2/2012 Zaghib et al. .................. 427/122
2004/0202934 A1 * 10/2004 Zaghib et al. .............. 429/231.1
(Continued)

FOREIGN PATENT DOCUMENTS

WO 2010023185 3/2010

OTHER PUBLICATIONS

Azais et al. "Causes of supercapacitors ageing in organic electrolyte", Journal of Power Sources. Dated 2007.
(Continued)

*Primary Examiner* — David Nhu
(74) *Attorney, Agent, or Firm* — Soler & Haroun, LLP

(57) ABSTRACT

A method is provided for developing a hybrid supercapacitor. The method includes the use of a lithium salt of the electrolyte to carry out the intercalation/insertion of the lithium at the negative electrode but by greatly increasing the concentration of lithium ions of the electrolyte order to subsequently accept a depletion. As the depletion in ions has an impact on the conductivity, the amount and the concentration of the electrolyte are chosen in order to make it possible to accept this depletion white retaining a conductivity of the electrolyte compatible with a powerful system for storage of energy. A portion of the $Li^+$ ions present in the electrolyte is used to form the passivation layer and the compound for intercalation/insertion $Li_{-0.5}C_6$ at the negative electrode.

21 Claims, 6 Drawing Sheets

(56) References Cited

U.S. PATENT DOCUMENTS

2008/0285211 A1* 11/2008 Zaghib et al. ................. 361/528
2009/0176164 A1    7/2009 Matsui et al.
2012/0135311 A1*  5/2012 Zaghib et al. .............. 429/231.1
2014/0356725 A1* 12/2014 Zaghib et al. .............. 429/231.5

OTHER PUBLICATIONS

Search Report Dated 2012.

* cited by examiner

METHOD FOR ASSEMBLING A HYBRID LITHIUM SUPERCAPACITOR

RELATED APPLICATIONS

This application is a National Phase Application of PCT/FR2012/050837, filed on Apr. 17, 2012, which in turn claims the benefit of priority from French Patent Application No. 11 55048 filed on Jun. 9, 2011, the entirety of which are incorporated herein by reference.

BACKGROUND

1. Field of the Invention

The present invention relates to a process for assembling a hybrid electrochemical system.

2. Description of Related Art

It is known, in the prior art, that a hybrid supercapacitor, combining the storage principles of a lithium ion secondary battery and of an electrochemical double-layer capacitor (EDLC), has a higher energy density, generally of the order of 7 Wh·kg$^{-1}$, than a standard EDLC. A symmetrical cell of a standard EDLC is composed of two identical capacitive electrodes. The potential difference of such an uncharged cell is 0 V and it increases linearly with time during the galvanostatic charging of the cell. During the charging, the potential of the positive electrode increases linearly and the potential of the negative electrode decreases linearly.

During discharging, the cell voltage decreases linearly. Industrial symmetrical EDLCs operating in an organic medium usually have a nominal voltage of 2.7 V. A contrario, the electrode of lithium battery type is characterized by a virtually constant potential during the charging and discharging of the system. In order to increase the operating voltage of a supercapacitor, it is possible to replace the negative electrode of an EDLC with a carbon-based electrode of "lithium battery" type.

The main problems to be solved in this type of hybrid supercapacitor are the formation of the passivation layer and the intercalation/insertion of the lithium into the negative electrode. In a first step, the passivation of the negative electrode makes the formation possible, on this electrode, of an intermediate layer during a first specific charging cycle. In the presence of this passivation layer, the lithium ions are desolvated before being intercalated/inserted into the negative electrode. The presence of a well-formed passivation layer makes it possible to prevent the exfoliation of the negative carbon electrode during the cycling of the system. The lithium is intercalated/inserted into the negative electrode until a composition $Li_{\sim 0.5}C_6$ is achieved. Thus, the potential of the negative electrode remains relatively stable during the successive charges/discharges of the hybrid supercapacitor.

In the state of the art, different solutions are normally selected to produce the passivation layer and to intercalate/insert a sufficient amount of lithium ions into the negative electrode:

i) to use a source of lithium metal in order to prevent the electrolyte from being depleted, as described, for example, in patent application EP-A1-1 400 996;

ii) to carry out the ex situ intercalation/insertion of the lithium into the electrode active material, for example by reactive grinding;

iii) to saturate the surface functional groups of the activated positive carbon electrode by means of an electrolytic solution comprising lithium ions, for example by means of an aqueous LiOH solution, as provided for in patent application JP 2008-177263. The lithium present in the positive electrode subsequently makes it possible to carry out the intercalation/insertion into the negative electrode without depleting the electrolyte.

The disadvantage of the use of lithium metal is that it is particularly expensive and restrictive industrially. Furthermore, in the presence of organic solvent, the lithium metal can give rise to thermal runaway and can thus present safety problems.

The ex situ production of a compound for intercalation/insertion of the lithium is also problematic: the material subsequently has to be able to be handled for the purpose of the manufacture of the energy storage system. In point of fact, it is known that these materials are particularly reactive with regard to oxygen, water and nitrogen.

These three solutions are thus not economically and/or technically satisfactory.

There is also known, from the publication "High-energy density graphite/AC capacitor in organic electrolyte" (V. Khomenko, E. Raymundo-Pinero and F. Beguin), which appeared in the Journal of Power Sources, 177 (2008), 643-651, a process for assembling a hybrid supercapacitor, that is to say an electrochemical energy store system comprising, on the one hand, a negative electrode based on nonporous or only slightly porous carbon (for example graphite), said electrode being an electrode conventionally used as anode in lithium batteries, and, on the other hand, a positive electrode typically used in electrochemical double-layer capacitors, that is to say based on nanoporous carbon, in which the intercalation/insertion of the lithium at the negative electrode is carried out using the lithium salt occurring in the electrolyte. However, the cells used are laboratory cells providing a sufficiently great reservoir of electrolyte for the conductivity and the composition of the electrolyte to remain unchanged during the intercalation/insertion of the lithium into the negative electrode. In the case of more compact systems, the volume of electrolyte is limited and the intercalation/insertion of the lithium into the negative electrode depletes the electrolyte, which brings about a fall in the performance of the system.

OBJECTS AND SUMMARY

The inventors have developed a hybrid supercapacitor which makes it possible to overcome the disadvantages of the state of the art.

In particular, the disadvantages of the solutions provided in the prior art are overcome, according to the process in accordance with the present invention, by using, as in the final publication cited, the lithium salt of the electrolyte to carry out the intercalation/insertion of the lithium at the negative electrode but by greatly increasing the concentration of lithium ions of the electrolyte in order to subsequently accept a depletion. As the depletion in ions has an impact on the conductivity, the amount and the concentration of the electrolyte are chosen in order to make it possible to accept this depletion while retaining a conductivity of the electrolyte compatible with a powerful system for storage of energy. A portion of the Li ions present in the electrolyte is used to form the passivation layer and the compound for intercalation/insertion $Li_{\sim 0.5}C_6$ at the negative electrode.

This invention has not been envisaged previously by a person skilled in the art, who has never been prompted to take this route, in particular as it is not obvious to obtain a sufficiently high concentration of Li$^+$ ions with a conventional electrolyte (for example, with the conventional ionic compound $LiPF_6$, the solvents of conventional electrolytes are saturated under standard conditions at approximately 1.5 mol/l, which is too low a concentration for the depletion of the solution to be acceptable in terms of conductivity and of amount of ions present in the solution).

A subject matter of the present invention is thus a process for the preparation of a hybrid supercapacitor, said process comprising at least one stage of assembling a negative electrode based on at least one nonporous carbon-based material and a positive electrode based on at least one porous carbon-based material, said electrodes being separated from one another by means of a separator impregnated with a liquid electrolyte comprising at least one lithium salt in solution in at least one solvent, then at least one first stage of charging, said process being characterized in that:

a) the concentration of ionic lithium in the liquid electrolyte before the first charging stage is greater than or equal to 1.6 mol/l, b) the lithium salt of the liquid electrolyte comprises at least 50% by weight of a salt chosen from lithium bis(trifluoromethanesulfonyl)imide (LiTFSI) and its derivatives, such as lithium bis(fluorosulfonyl)imide (LiFSI) and lithium bis(pentafluoroethylsulfonyl)imide (LiBETI);

c) the solvent of the liquid electrolyte comprises at least 80% by volume of a solvent chosen from cyclic alkyl carbonates, in particular chosen from ethylene carbonate (EC) and propylene carbonate (PC), acyclic alkyl carbonates, chosen in particular from dimethyl carbonate (DMC), diethyl carbonate (DEC) and methyl isopropyl carbonate (MiPC), lactones (such as β- and γ-lactones and caprolactones), esters, such as ethyl acetate and ethyl butyrate (EB), oxalanes, such as dimethoxyethane (DME), and their mixtures, it being understood that said solvent comprises at least 20% by volume of ethylene carbonate;

d) the porous carbon-based material of the positive electrode is chosen from materials in which the mean dimension of the pores is greater than 0.7 nm and which have a specific surface of greater than 700 m$^2$/g, in particular varying from 700 to 2000 m$^2$/g, approximately (B.E.T. method);

e) the nonporous carbon-based material of the negative electrode is chosen from materials which are capable of intercalating/inserting the lithium ions and which have a specific surface of less than or equal to 150 m$^2$/g, in particular 80 m$^2$/g;

f) after the assembling stage, the charging of said supercapacitor is carried out in several successive charging stages up to a maximum voltage ($U_{max}$) of between 4 and 5 volts and at a current density varying from 10 mA/g to 400 mA/g, each charging stage being separated from the following charging stage by an intermediate stage of self-discharging or discharging at a current of less than 5 mA/g.

In a variant embodiment, the successive charging stages are furthermore separated by self-discharging stages.

According to the invention, the combination of the successive charging stages and of the stages of self-discharging or discharging at low current (also known as relaxation stages) of stage f) is known as formation cycle. According to the process in accordance with the present invention, the formation cycle results in the formation of the passivation layer and in the intercalation/insertion of the lithium ions into the negative electrode. The successive charging stages result in the consumption of the lithium ions present in the electrolyte and in a decrease in its concentration.

The choice is made to carry out several successive stages of discharging at very low current or in self-discharging, so as to be able to achieve a total charging time which makes possible the intercalation/insertion of the lithium into the negative electrode. In the specific case of graphite, the intercalation of the lithium results in the formation of the intercalation compound $Li_{-0.5}C_6$. Thus, when the supercapacitor is in operation, the potential of the negative electrode remains relatively stable.

The appended FIG. 1 represents the change in the conductivity (mS/cm) as a function of the concentration (mol/l) of a liquid electrolyte including LiTFSI in an EC/DMC (1/1, v/v) mixture during the energy storage process in a supercapacitor in accordance with the invention. This figure shows that the concentration of lithium ions of the electrolyte is chosen as very high (point B) with respect to the optimum concentration (point A). The charging/relaxation cycles of stage f) make possible the formation of the passivation layer and make it possible to intercalate/insert the lithium ions into the negative electrode. These cycles result in a decrease in the concentration of the electrolyte down to the point A (optimum). It is thus possible, by virtue of the process in accordance with the invention, to obtain a supercapacitor which operates correctly and has a performance which is not damaged, while enduring a significant difference in potential, in particular of greater than 4 V. Thus, at the end of the formation stage, the amount of lithium ions intercalated into the negative electrode is sufficient to make it possible for the potential of the system to remain relatively constant during its operation. The process in accordance with the invention makes it possible to access supercapacitors having a much greater energy density than the electrochemical double-layer supercapacitors of the state of the art.

According to a preferred embodiment of the invention, the concentration of ionic lithium in the liquid electrolyte before the first charging stage is greater than or equal to 2.0 mol/l approximately.

Also according to a preferred embodiment of the invention, the liquid electrolyte is chosen from the following lithium salt/solvent(s) pairs:

i) LiTFSI-EC/DMC (1/1; v/v) mixture;
ii) LiFSI-EC/DMC (1/1; v/v) mixture;
iii) LiBETI-EC/DMC (1/1; v/v) mixture;
iv) LiTFSI-EC/EB/DMC (1/1/3; v/v/v) mixture;
v) LiTFSI-EC/MiPC/DMC (2/1/3/; v/v/v) mixture;
vi) LiTFSI-EC/DME (1/2; v/v) mixture.

Conventionally, the lithium-comprising ionic compound (compound which, in a solvent, dissociated to form Li$^+$ ions) and the solvent are chosen so that the electrolyte has the highest possible Walden product at the temperature at which the materials are brought together (in particular 20° C. to 25° C.). The Walden product Λη is the product of the viscosity (η in mPa·s) by the molar conductivity of the compound (Λ=σ/C in mS·cm$^{-1}$(mol·l$^{-1}$)$^{-1}$). The Walden products for different liquid electrolytes based on LiTFSI which can be used according to the process of the invention, in comparison with that of a liquid electrolyte based on LiPF$_6$ alone in a mixture of solvents already known, are presented in table 1 below:

TABLE 1

| | Conductivity at 20° C. | Viscosity at 25° C. | Λη |
|---|---|---|---|
| Salt: LiTFSI | | | |
| EC/DMC | 9.3 | 3.52 | 32.7 |
| EC/EB/3DMC | 9.08 | 3.58 | 32.5 |

TABLE 1-continued

|  | Conductivity at 20° C. | Viscosity at 25° C. | Δη |
|---|---|---|---|
| 2EC/MiPC/3DMC | 9.83 | 3.46 | 34.0 |
| EC/2DME | 18.1 | 3.0 | 54.3 |
| EC/DEC | 6.8 | 3.25 | 22.1 |
| EC/PC/3DMC | 8 | 3.56 | 28.5 |
| Salt: LiPF$_6$ | | | |
| EC/DMC | 11.20 | 3.50 | 39.2 |
| EC/PC/3DMC | 10.58 | 3.56 | 37.6 |

N.B.: In this table, the proportions of the solvents used in a mixture are given by volume; for example, EC/DMC means that the solvent is composed of a mixture of equal volumes of EC and DMC.

As is seen in this table, the values of the pairs chosen are of the same order of magnitude as the normal electrolytes, which confirms their advantage for the application.

In addition to the lithium salts mentioned above in point b) during the presentation of the invention (main lithium salts), the liquid electrolyte which can be used according to the process in accordance with the invention can additionally include LiPF$_6$ as additional lithium salt.

When the liquid electrolyte includes LiPF$_6$ as additional lithium salt, the latter is present in the electrolyte in an amount by weight which is lower than that of the lithium salts defined above in point b), this amount representing at most a quarter of the molar amount of lithium salts mentioned in point b) and preferably from 1% to 10% by weight, with respect to the weight of lithium salts mentioned in point b) above. The presence of this additional lithium salt is advantageous insofar as it makes it possible to passivate the aluminum collector of the positive electrode.

The porous carbon-based material of the positive electrode is preferably chosen from carbide-derived carbon (CDC), porous carbon nanotubes, porous carbon blacks, porous carbon fibers, carbon onions or carbons resulting from coke (the porosity of which is increased by charging). According to a preferred embodiment of the invention, the specific surface of the porous carbon-based material of the positive electrode varies from 1200 to 1800 m$^2$/g approximately (B.E.T. method).

The density of the porous carbon-based material of the positive electrode preferably varies from 0.5 to 0.8 g/cm$^3$.

The content of oxygen in the porous carbon-based material of the positive electrode is preferably less than 2% by weight.

The positive electrode preferably has a thickness varying from 70 to 120 μm approximately.

The nonporous carbon-based material of the negative electrode is chosen from materials making possible the intercalation/insertion of the lithium. The nonporous carbon-based material of the negative electrode is preferably chosen from graphite, low-temperature carbons (hard or soft), carbon black, nonporous carbon nanotubes and nonporous carbon fibers.

The density of the nonporous carbon-based material of the negative electrode preferably varies from 1.0 to 1.9 g/cm$^3$. The specific surface (B.E.T. method) of the nonporous carbon-based material of the negative electrode is preferably less than 50 m$^2$/g approximately.

The negative electrode preferably has a thickness varying from 40 to 70 μm approximately.

According to a preferred embodiment of the invention, the ratio of the weight of the positive electrode to the weight of the negative electrode is greater than or equal to 1. This ratio $M_{E+}/M_{E-}$ preferably varies from 1 to 5 inclusive. According to a very particularly preferred embodiment of the invention, the ratio $M_{E+}/M_{E-}$ is equal to 1. This ratio is preferably optimized so as to have the same charging number at the positive and negative electrodes.

In addition to the carbon-based material (porous carbon-based material of the positive electrode and nonporous carbon-based material of the negative electrode), the positive and/or negative electrodes generally comprise at least one binder and optionally at least one agent conferring an electron conductivity.

The binder can be chosen from organic binders which are conventionally known to a person skilled in the art and which are electrochemically stable up to a potential of 5 V vs Li. Mention may in particular be made, among such binders, of:
  homopolymers and copolymers of vinylidene fluoride, such as poly(vinylidene fluoride) (PVDF),
  copolymers of ethylene, propylene and a diene,
  homopolymers and copolymers of tetrafluoroethylene,
  homopolymers and copolymers of N-vinylpyrrolidone.
  homopolymers and copolymers of acrylonitrile,
  homopolymers and copolymers of methacrylonitrile,
  and the like.

When it is present, the binder preferably represents from 5% to 15% by weight approximately, with respect to the total weight of the electrode.

The agent conferring electron conduction properties can be carbon, preferably chosen from carbon blacks, such as acetylene black, carbon blacks having a high specific surface, such as the product sold under the name Ketjenblack® EC-600JD by Akzo Nobel, carbon nanotubes, graphite or mixtures of these materials. It can also be an aqueous dispersion of carbon black or graphite, such as the product sold under the trade name Electrodag® EB-012 by Acheson. Other products can also be used.

According to the invention, the material conferring electron conduction properties preferably represents from 1% to 10% by weight approximately, with respect to the total weight of the electrode.

According to the invention, the composite material constituting the electrodes is preferably deposited on a current collector, such as a copper current collector for the negative electrode and an aluminum current collector for the positive electrode.

The temperature for implementation of the process in accordance with the invention can be ambient temperature but can also be a higher temperature than ambient temperature (for example between 25° C. and 70° C.) in order to increase the solubility of the lithium-comprising compound in the solvent used. According to an alternative form, the process in accordance with the invention is carried out at a temperature greater than or equal to 35° C. Thus, the charging/relaxation cycles for forming the passivation layer and intercalating/inserting the lithium into the negative electrode are carried out at a temperature greater than or equal to 35° C. This makes it possible to accelerate the formation of the passivation layer.

The liquid electrolyte which can be used according to the process in accordance with the invention can additionally include one or more cosolvents intended to increase the ionic conductivity and to extend the temperature of use, such cosolvents being chosen from alkyl esters, such as ethyl acetate, methyl propanoate, ethyl propanoate, ethyl butyrate, methyl butyrate, and the like, and their mixtures. When they are used, the cosolvent or cosolvents preferably represent from 20% to 80% by volume, with respect to the total weight of the liquid electrolyte. These cosolvents make it possible in particular to improve the cold performance of the supercapacitor.

According to a preferred embodiment of the invention, the duration of the relaxation stages between each of the successive charging stages of stage f) varies from 1 to 3 hours approximately.

According to a particularly preferred embodiment of the invention, stage f) comprises the following substages:

1) a substage 1 of charging at a current density of between 10 and 400 mA/g up to a voltage $U_{max1}$ of between 4.0 V and 5 V inclusive, followed by a relaxation period with a minimum duration of 1 hour;

2) a substage 2 of charging at a current density of between 10 and 400 mA/g up to a voltage $U_{max2} > U_{max1}$ and $\leq 5$ V, followed by a relaxation period with a minimum duration of 1 hour;

3) a substage 3 of charging at a current density of between 10 and 400 mA/g up to a voltage $U_{max3} > U_{max2}$ and $\leq 5$ V, followed by a relaxation period with a minimum duration of 1 hour;

4) a substage 4 of charging at a current density of between 10 and 400 mA/g up to a voltage $U_{max4} > U_{max3}$ and $\leq 5$ V, followed by a relaxation period with a minimum duration of 1 hour;

5) a substage 5 of charging at a current density of between 10 et 400 mA/g up to a voltage $U_{max5} > U_{max4}$ and $\leq 5$ V, followed by a relaxation period with a minimum duration of 1 hour.

Substage 5) of the formation cycle can be repeated until a stable potential of approximately 0 V is obtained at the negative electrode in the case of a 3-electrode cell, where the potential of each electrode of the system can be monitored. In the case of a 2-electrode cell, the formation cycle is halted either as a function of the results obtained in the 3-electrode cell or when the voltage at the end of the relaxation period is the same from one substage to another, indicating a stabilization of the potential of the negative electrode.

In the specific case of graphite, substage 5) can be repeated until a stable potential of the negative electrode of approximately 0.1 V vs. Li$^+$/Li is obtained. Carrying out stage f) of the process in accordance with the invention then makes it possible to form the intercalation compound $Li_{\sim 0.5}C_6$ at the negative electrode.

The charging/relaxation cycles can also comprise more or fewer stages than described here, it also being possible for the charging voltages to vary.

The present invention is illustrated by the following examples, to which, however, it is not limited.

It will be noted that the product resulting from the process according to the invention comprises electrodes as described in points d) and e) of claim 1 and an electrolyte comprising a lithium salt and a solvent as described in points b) and c) of claim 1. On the other hand, the concentration of lithium in the electrolyte of the final product can be less than the threshold defined in the claim.

It will also be noted that the negative electrode of the final product is a graphite electrode and that the intercalation compound formed is preferably approximately of stage 2 intercalation, i.e. $Li_{\sim 0.5}C_6$.

DETAILED DESCRIPTION AND EXAMPLES

Example 1

A hybrid supercapacitor was prepared according to the following process, in accordance with the invention:

Positive electrode: 80% by weight of porous activated carbon (specific surface $(SB_{ET})=1670$ m$^2$/g), 10% by weight of PVDF and 10% by weight of carbon black. This composite electrode material was coated onto an aluminum current collector having a thickness of 30 μm. Thickness of the coating (after drying and calendering): 100 μm.

Negative electrode: 91% by weight of graphite sold under the trade name SLP30 by Timcal, 8% by weight of PVDF and 1% by weight of carbon black. This composite electrode material was coated onto a copper collector. Thickness of the coating: 50 μm.

Electrolyte used: 2 mol/l LiTFSI in a 1:1 (v/v) EC/DMC mixture.

An Li$^+$/Li reference electrode was added in order to monitor the change in the potentials of the positive and negative electrodes. It will be noted that this electrode has been incorporated in the assembly only for the purpose of carrying out measurements and does not form an integral part of the invention.

Figure 1:
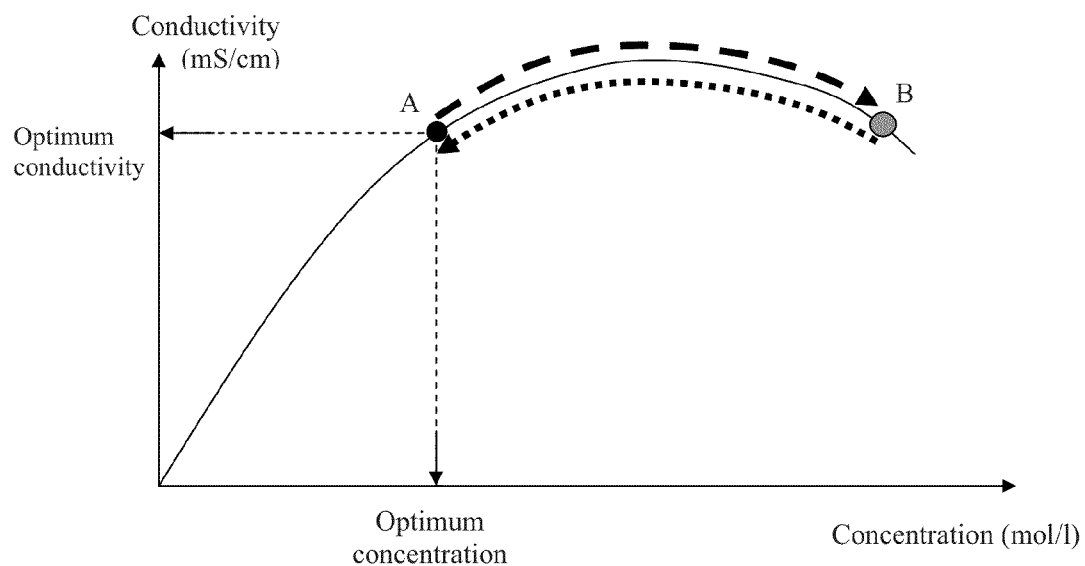
FIG. 1 is a graph of the change in the conductivity as a function of the concentration of a liquid electrolyte including LiTFSI in an EC/DMC in a supercapacitor in accordance with the invention.
Figure 2:
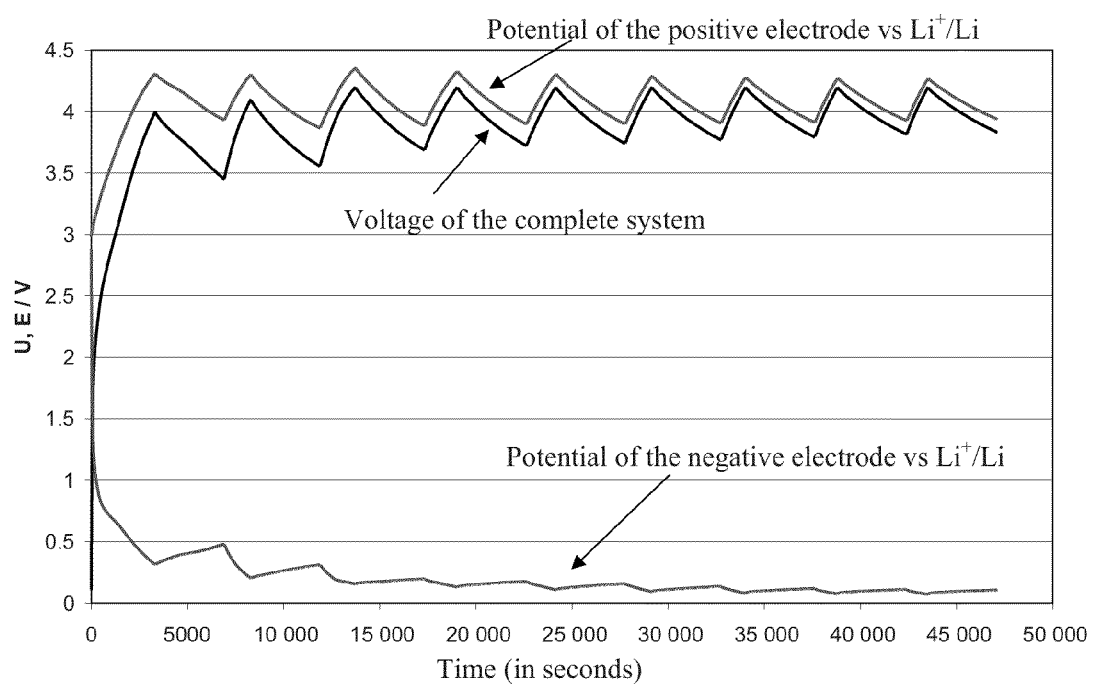
FIG. 2 is a graph of voltage and the potentials of electrodes (in volts) are a function of the time (in sec.) in accordance with Example 1.

After assembling, the system was charged according to the formation cycle in accordance with the invention comprising stages of charging by chronopotentiometry, followed by a relaxation period of 2 hours, as described in the appended FIG. 2, in which the voltage and the potentials of electrodes (in volts) are a function of the time (in sec.). Cycles of charging (at 37.2 mA/g)/self-discharging are concerned. The voltage of the system at the end of the cycles was 4.2 V.

The characteristics of the negative electrode were chosen so that its potential was of the order of 0.1 V vs Li$^+$/Li after the end of the charging/self-discharging cycles, corresponding approximately to the stage 2 intercalation of the lithium into the graphite.

Subsequently, galvanostatic cycles at ±0.65 A/g were carried out on the system between $U_{max}$=4.2V and $U_{min}$=1.5V at ambient temperature. A galvanostatic cycle corresponds to a charging and a discharging of the system.

Figure 3:
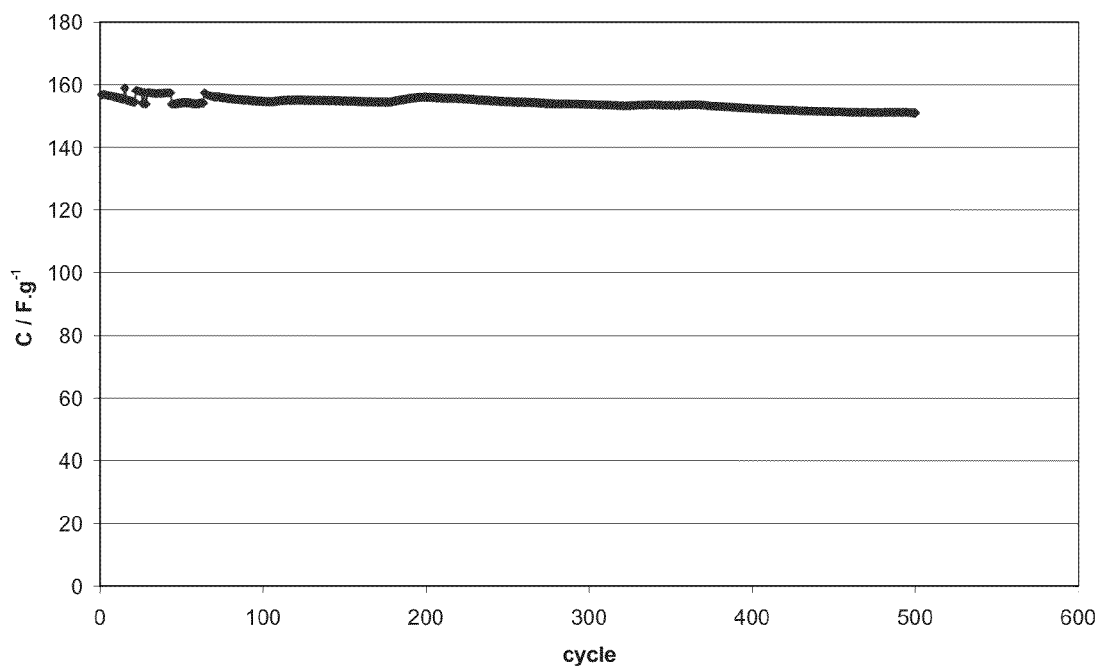
FIG. 3 is a graph of the gravimetric capacity (in F.g$^{-1}$) expressed as a function of the number of cycles in accordance with Example 1.
Figure 4:
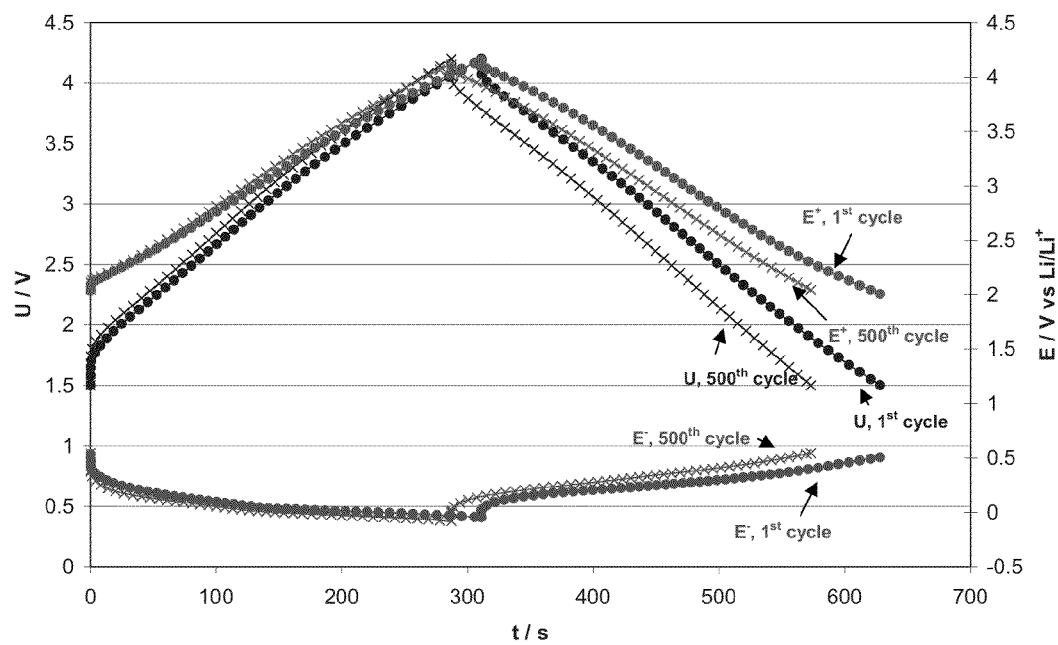
FIG. 4 is a graph of the change in the potentials (in V) of the two electrodes and of the voltage (in V) as a function of the time (in sec.) in accordance with Example 1.

The result of this cycling is shown in the appended FIG. 3, in which the gravimetric capacity (in $F \cdot g^{-1}$) is expressed as a function of the number of cycles. The appended FIG. 4 shows the change in the potentials (in V) of the two electrodes and of the voltage (in V) as a function of the time (in sec.) during the first cycle and after 500 cycles.

Figure 5:
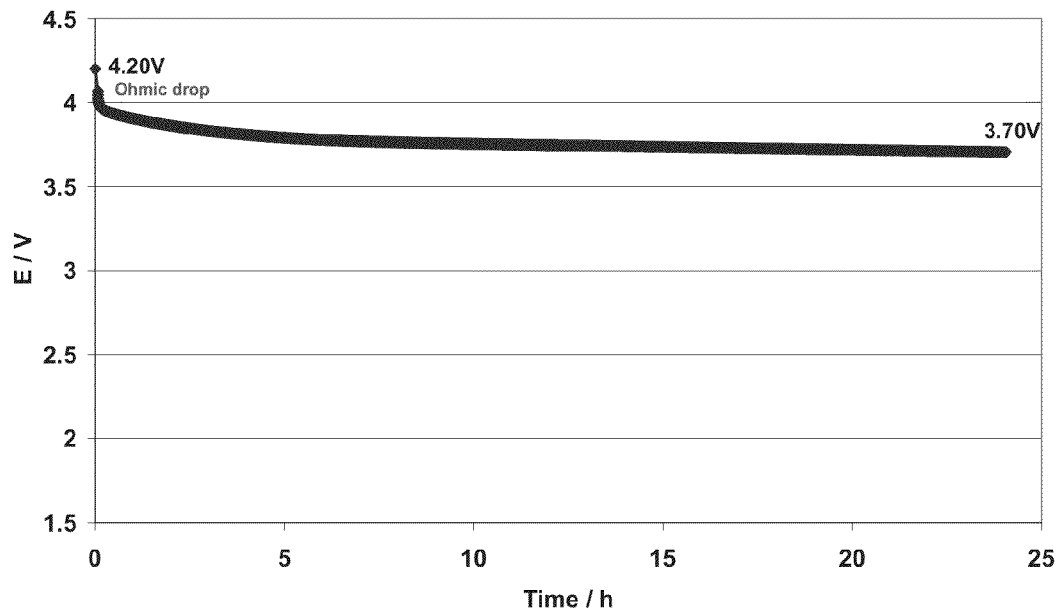
FIG. 5 is a graph of the voltage (in V) as a function of the time (in hours)) in accordance with Example 1.

The self-discharging of the two-electrode system was also measured after 500 cycles. The voltage is then maintained at 4.2 V for 30 min and subsequently the self-discharging is recorded (appended FIG. 5, in which the voltage (in V) is a function of the time (in hours)).

The performance after the formation cycles of the system is presented in table 2 below.

Comparative Example 1

A symmetrical supercapacitor not in accordance with the invention was prepared according to the following method:
Positive electrode: 80% by weight of porous activated carbon (specific surface ($S_{BET}$)=1670 m²/g), 10% by weight of PVDF and 10% by weight of carbon black. This composite electrode material was coated onto an aluminum current collector having a thickness of 30 μm. Thickness of the coating: 100 μm.
Negative electrode: it is identical to the positive electrode: 80% by weight of porous activated carbon (specific surface ($S_{BET}$)=1670 m²/g), 10% by weight of PVDF and 10% by weight of carbon black. This composite electrode material was coated onto an aluminum current collector having a thickness of 30 μm. Thickness of the coating: 100 μm.

It will be noted that the two electrodes are here identical to the positive electrode of example 1.
Electrolyte used: 2 mol/l LiTFSI in a 1:1 (v/v) EC/DMC mixture.
An Li⁺/Li reference electrode was added in order to monitor the change in the potentials of the positive and negative electrodes.

Figure 6:
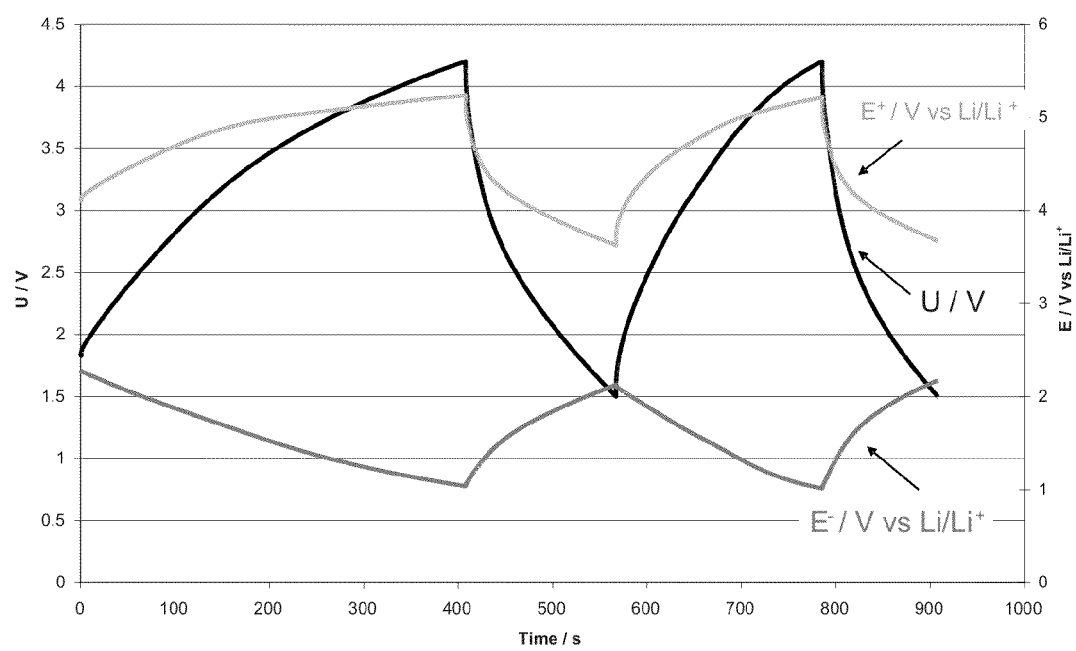
FIG. 6 is a graph of the voltage and the potentials of electrodes (in volts) as a function of the time (in sec.) in accordance with comparative Example 1.

After assembling, the galvanostatic cycles were carried out on the system at ±0.65 A/g between $U_{max}$=4.2 V and $U_{min}$=1.5 V at ambient temperature. The galvanostatic cycling (0.65 A/g) could not be carried out due to the high decomposition of the electrolyte at the positive electrode. The potential of the positive electrode reaches more than 5 V vs Li⁺/Li, as shown in the appended FIG. 6, in which the voltage and the potentials of electrodes (in volts) are a function of the time (in sec.).

The performance of the system is presented in table 2 below.

Comparative Example 2

A symmetrical supercapacitor not in accordance with the invention was prepared according to the following method, in accordance with that described in comparative example 1:
Positive electrode: 80% by weight of porous activated carbon (specific surface ($S_{BET}$)=1670 m²/g), 10% by weight of PVDF and 10% by weight of carbon black. This composite electrode material was coated onto an aluminum current collector having a thickness of 30 μm. Thickness of the coating: 100 μm.
Negative electrode: identical to the positive electrode: 80% by weight of porous activated carbon (specific surface ($S_{BET}$)=1670 m²/g), 10% by weight of PVDF and 10% by weight of carbon black. This composite electrode material was coated onto an aluminum current collector having a thickness of 30 μm. Thickness of the coating: 100 μm.
Electrolyte used: 2 mol/l LiTFSI in a 1:1 (v/v) EC/DMC mixture.
An Li⁺/Li reference electrode was added in order to monitor the change in the potentials of the positive and negative electrodes.

Figure 7:
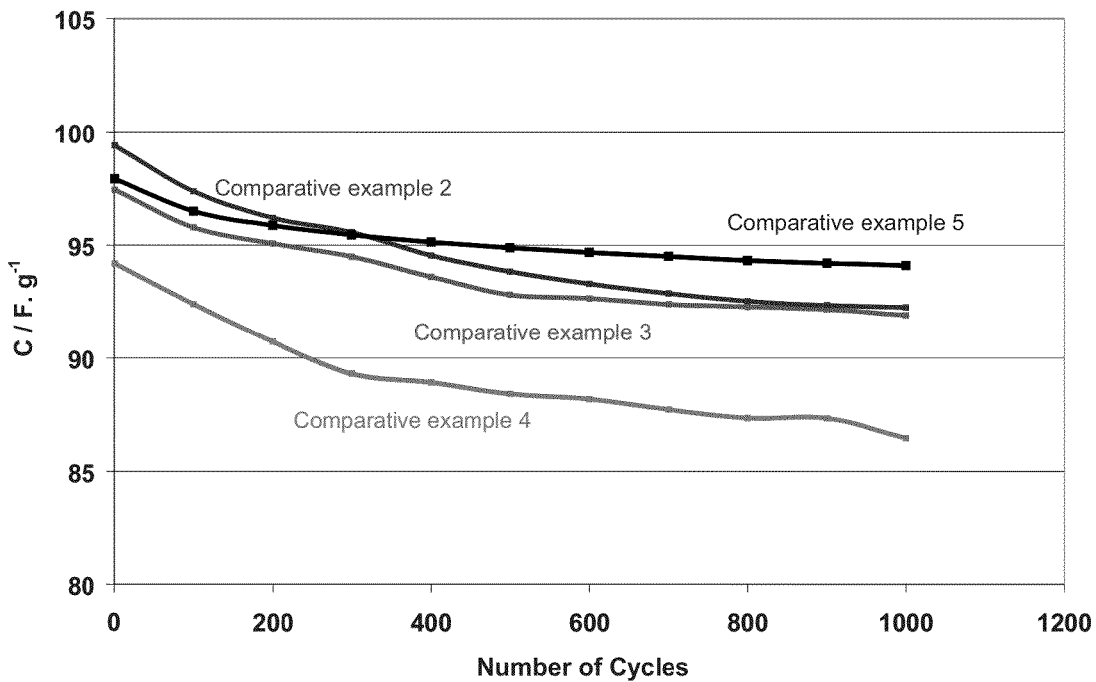
FIG. 7 is a graph of the gravimetric capacity (in F/g) plotted as a function of the number of cycles (topmost curve) in accordance with comparative Example 2.

After assembling, galvanostatic cycles were carried out at ±0.65 A/g on the system between $U_{max}$=2.5 V and $U_{min}$=0 V at ambient temperature. The results are presented in the appended FIG. 7, in which the gravimetric capacity (in F/g) is plotted as a function of the number of cycles (topmost curve).

The performance of the system is presented in table 2 below.

Comparative Example 3

In this example, a symmetrical supercapacitor not in accordance with the invention and identical to that of comparative example 2 was prepared but the electrolyte was replaced with 1.6 mol/l of (LiTFSI+1 mol % of $LiPF_6$) in a 1:1 (v/v) EC/DMC mixture. The voltage was limited to 2.5 V also. Galvanostatic cycling at ±0.65 A/g was carried out on the system at ambient temperature. The results are presented in FIG. 7 (intermediate curve).

The performance of the system is presented in table 2 below.

Comparative Example 4

In this example, a symmetrical supercapacitor not in accordance with the invention and identical to that of comparative example 2 was prepared but the electrolyte was replaced with 2 mol/l of (LiTFSI+1 mol % of $LiPF_6$) in a 1:1 EC/DMC mixture. The voltage was also limited to 2.5 V. Galvanostatic cycling at ±0.65 A/g was carried out on the system at ambient temperature. The results are presented in the appended FIG. 7 (bottommost curve).

The performance of the system is presented in table 2 below.

Comparative Example 5

In this example, a symmetrical supercapacitor not in accordance with the invention and identical to that of comparative example 2 was prepared but the electrolyte was replaced with 1 mol/l $TEABF_4$ in acetonitrile.

After assembling, the system was charged while limiting the voltage to 2.5 volts. Galvanostatic cycling at ±0.65 A/g was carried out on the system at ambient temperature.

The performance of the system is presented in table 2 below.

Comparative Example 6

A hybrid supercapacitor not in accordance with the invention was prepared according to the following method:
Positive electrode: 80% by weight of porous activated carbon (specific surface ($S_{BET}$)=1670 m²/g), 10% by weight of PVDF and 10% by weight of carbon black. This composite electrode material was coated onto an aluminum current collector having a thickness of 30 μm. Thickness of the coating: 100 μm.
Negative electrode: 91% by weight of graphite sold under the trade name SLP30 by Timcal, 8% by weight of PVDF and 1% by weight of carbon black. This composite electrode material was coated onto a copper collector. Thickness of the coating: 50 µm.

It will be noted that the positive and negative electrodes are identical to those of example 1.

Electrolyte used: 2 mol/l LiTFSI+1% LiPF$_6$ in a 1:1 (v/v) EC/DMC mixture.

An Li$^+$/Li reference electrode was added in order to monitor the change in the potentials of the positive and negative electrodes.

Figure 8:
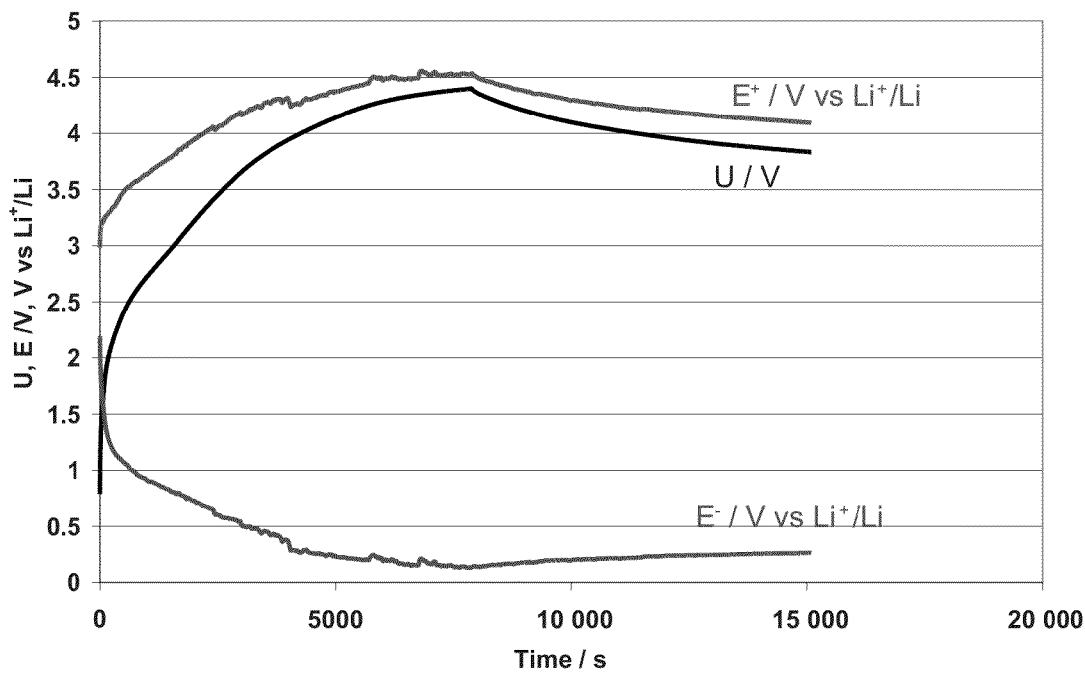
FIG. 8 is a graph of the change in the voltage and in the potentials of electrodes (in V) as a function of the time (in sec.) during the formation cycle in accordance with comparative Example 6.

After assembling, the formation cycle, not in accordance with the invention, consisted of a direct charging up to 4.4 V, followed by a period of self-discharging of 2 hours. The change in the voltage and in the potentials of electrodes (in V) as a function of the time (in sec.) during the formation cycle is shown in the appended FIG. 8.

Figure 9:
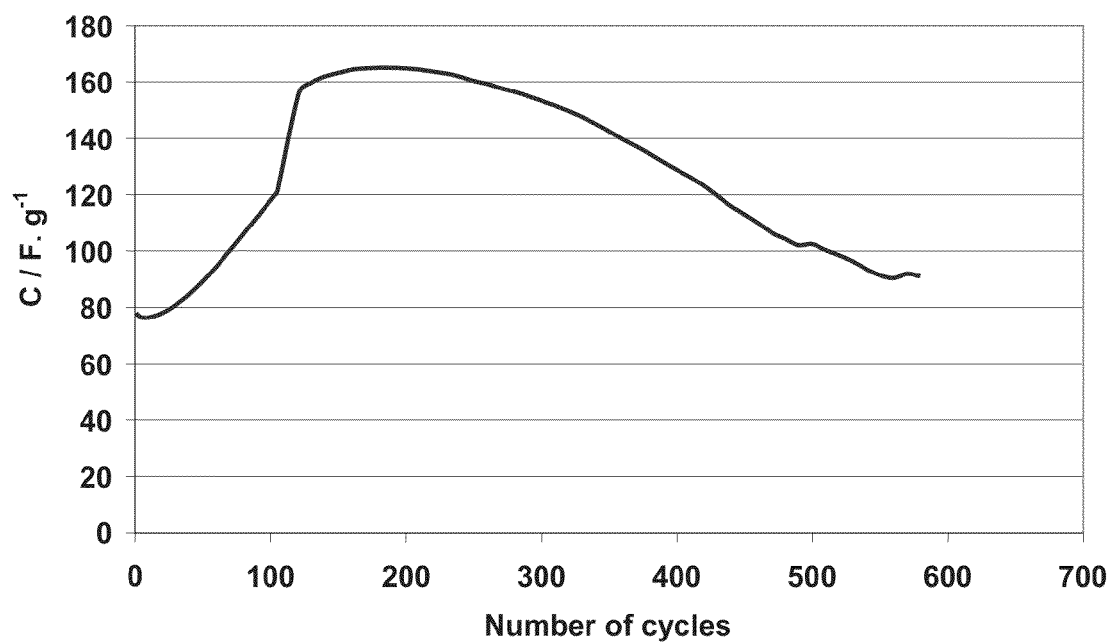
FIG. 9 is a graph of the gravimetric capacity (in F.g$^{-1}$) expressed as a function of the number of cycles in accordance with comparative Example 9.

Galvanostatic cycles were carried out on the system at ±0.65 A/g between U$_{max}$=4.4 V and U$_{min}$=1.5 V at ambient temperature. The result of the galvanostatic cycling is shown in the appended FIG. 9, in which the gravimetric capacity (in F·g$^{-1}$) is expressed as a function of the number of cycles.

The performance after the formation cycle of the system is presented in table 2 below.

Example 2 in Accordance with the Invention

A hybrid supercapacitor in accordance with the invention was prepared according to the following method:

Positive electrode: 80% by weight of porous activated carbon (specific surface (S$_{BET}$)=1670 m$^2$/g), 10% by weight of PVDF and 10% by weight of carbon black. This composite electrode material was coated onto an aluminum current collector having a thickness of 30 µm. Thickness of the coating: 100 µm.

Negative electrode: 91% by weight of graphite sold under the trade name SLP30 by Timcal, 8% by weight of PVDF and 1% by weight of carbon black. This composite electrode material was coated onto a copper collector. Thickness of the coating: 50 µm.

It will be noted that the positive and negative electrodes are identical to those of example 1 and that, in contrast to example 1, no reference electrode made of lithium metal is present in the system.

Electrolyte used: 2 mol/l LiTFSI+1 mol % LiPF$_6$ in a 1:1 (v/v) EC/DMC mixture.

After assembling, the system was charged according to the formation cycles in accordance with the invention comprising stages of charging by chronopotentiometry, followed by relaxation periods of 2 hours, as described in the appended FIG. 2, in which the voltage (in volts) is a function of the time (in sec.). Cycles of charging (at 37.2 mA/g)/self-discharging are concerned. The maximum voltage of the system was 4.4 V.

Figure 10:
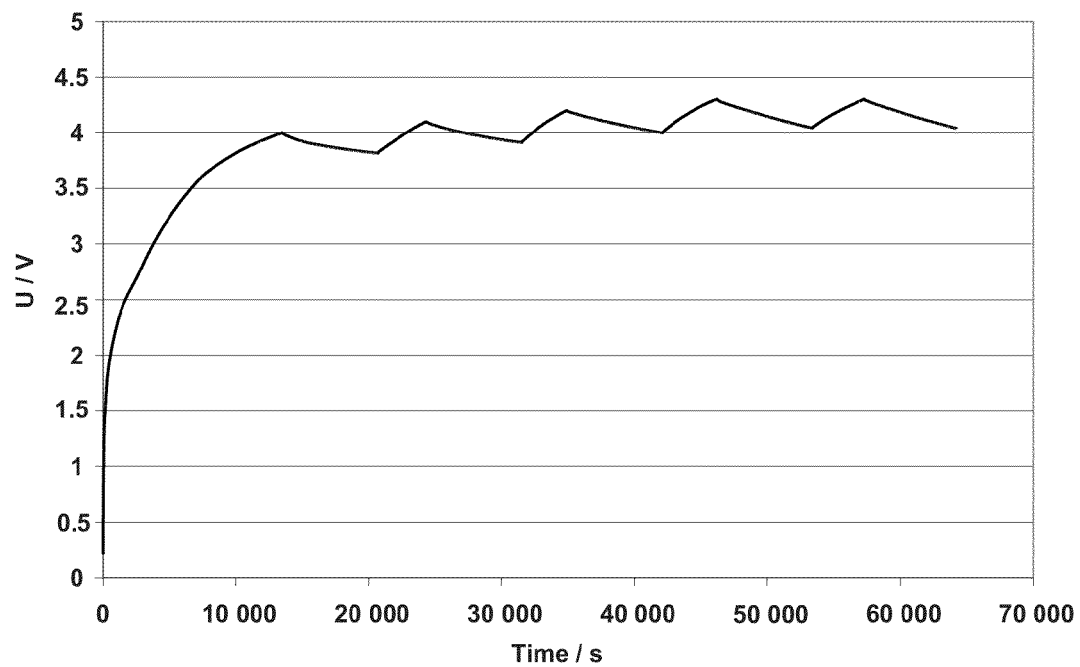
FIG. 10 is a graph of the change in the voltage (in V) as a function of the time (in sec.) during the formation cycles in accordance with Example 2.

The change in the voltage (in V) as a function of the time (in sec.) during the formation cycles is shown in the appended FIG. 10.

Figure 11:
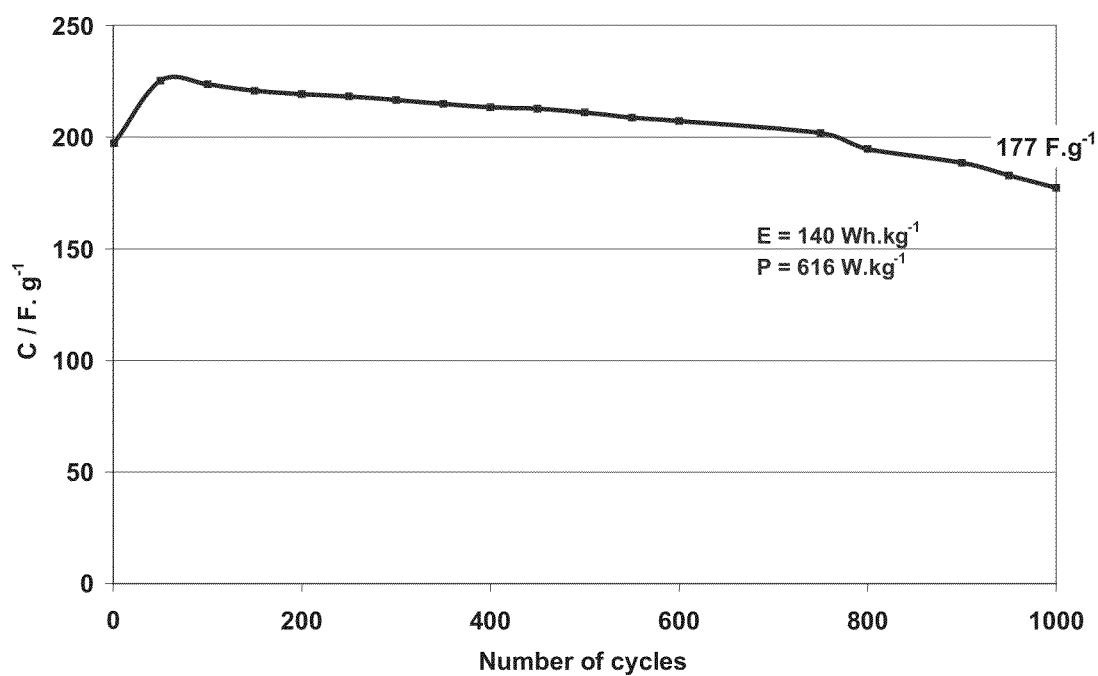
FIG. 11 is a graph of the gravimetric capacity (in F.g$^{-1}$) expressed as a function of the number of cycles in accordance with Example 2.

The galvanostatic cycles were carried out on the system at +0.65 A/g between U$_{max}$=4.4 V and U$_{min}$=1.5 V at ambient temperature. The result of this cycling is shown in the appended FIG. 11, in which the gravimetric capacity (in F·g$^{-1}$) is expressed as a function of the number of cycles.

The performance after the formation cycles of the system is presented in table 2 below.

The performances of the various systems prepared in the above examples are presented in the following table 2:

TABLE 2

| Example | System | Electrolyte | Gravimetric capacity (F/g) for 1 electrode | U$_{min}$-U$_{max}$ operating range (V) | Max. energy density (Wh/kg) | E−/E+ (V vs Li) after charging at U$_{max}$ |
|---|---|---|---|---|---|---|
| Ex. 1 | Hybrid (activated carbon/graphite) | 2M LiTFSI EC/DMC | 156 (stable) | 1.5-4.2 | 83 | 0.105/4.305 |
| Comparative Ex. 1 | Symmetrical (activated carbon/activated carbon) | 2M LiTFSI EC/DMC | Not calculated- does not operate | 0-4.2 V | Not calculated- does not operate | 1.0/5.2 |
| Comparative Ex. 2 | Symmetrical (activated carbon/activated carbon) | 2M LiTFSI EC/DMC | Falling: 99 then 95 after 500 cycles | 0-2.5 V | 18 | 1.88/4.31 |
| Comparative Ex. 3 | Symmetrical (activated carbon/activated carbon) | 1.6M LiTFSI + 1M % LiPF$_6$ EC/DMC | Falling: 98 then 94 after 500 cycles | 0-2.5 V | 18 | — |
| Comparative Ex. 4 | Symmetrical (activated carbon/activated carbon) | 2M LiTFSI + 1M % LiPF$_6$ EC/DMC | Falling: 95 then 89 after 500 cycles | 0-2.5 V | 17 | |
| Comparative Ex. 5 | Symmetrical (activated carbon/activated carbon) | 1M TEABF$_4$ ACN | 98 then 95 after 500 cycles | 0-2.5 V | 21 | |
| Comparative Ex. 6 | Hybrid (activated | 2M LiTFSI + | 80-160: unstable. After 500 cycles, | 1.5-4.4 | Cannot be reliably | |

TABLE 2-continued

| Example | System | Electrolyte | Gravimetric capacity (F/g) for 1 electrode | $U_{min}$-$U_{max}$ operating range (V) | Max. energy density (Wh/kg) | E-/E+ (V vs Li) after charging at $U_{max}$ |
|---|---|---|---|---|---|---|
| | carbon/ graphite) | 1% $LiPF_6$ EC/DMC | preferably 95 | | measured (capacity instability) | |
| Ex. 2 | Hybrid (activated carbon/ graphite) | 2M LiTFSI + 1% $LiPF_6$ EC/DMC | 197 then increases after a few cycles. After 500 cycles, 210 | 1.5-4.2 | 140 | — |

These combined results show, first of all, that the supercapacitors according to the invention make it possible to obtain a higher gravimetric capacity than the others (by comparing examples 1 and 2 with comparative examples 1 to 5). Furthermore, they can operate at a higher voltage (4.2 V). These two factors make it possible to considerably increase (by a factor of 5 to 10) the energy density of these supercapacitors. The latter thus make it possible, for the same size, to deliver a greater power and are for this reason particularly advantageous.

In addition, these hybrid supercapacitors age well since their gravimetric capacity (and thus their energy density) remains relatively constant for at least 500 cycles, which is not the case for the symmetrical supercapacitors in the same electrolyte.

The initial capacity is higher in example 2 than in example 1 as the maximum voltage is also higher. On the other hand, it is noted that the decrease in capacity is greater in the case of example 2 during the cycling, probably because of the corrosion of the aluminum, this being the case despite a slight addition of $LiPF_6$ to the electrolyte.

In addition, it is noticed that the formation cycle described in stage f) makes it possible to ensure the stability of the supercapacitor over time (unlike other charging processes, as is noticed in the light of comparative example 6) and to obtain both a supercapacitor which has a high energy density and which is also reliable.

Furthermore, the choice of the electrolytes which make good operation of the hybrid supercapacitors possible is not an obvious choice for a person skilled in the art. This is because it is clearly seen that these electrolytes are not optimum for symmetrical supercapacitors. The gravimetric capacities and the energy densities of comparative examples 2 to 4 are lower than those obtained in the typical conventional electrolyte 1 mol/l $TEABF_4$ in acetonitrile (comparative example 5).

Thus, the invention makes it possible to obtain a hybrid supercapacitor which makes it possible to increase the working voltage and thus to deliver a greater energy density than the symmetrical supercapacitors of the state of the art.

The invention claimed is:

1. A process for a preparation of a hybrid supercapacitor, said process comprising:
   at least one stage of assembling a negative electrode based on at least one nonporous carbon-based material and a positive electrode based on at least one porous carbon-based material, said positive and negative electrodes being separated from one another by means of a separator impregnated with a liquid electrolyte comprising at least one lithium salt in solution in at least one solvent, then at least one first stage of charging, wherein:
   a) a concentration of ionic lithium in the liquid electrolyte before the first charging stage is greater than or equal to 1.6 mol/l,
   b) the lithium salt of the liquid electrolyte comprises at least 50% by weight of a lithium salt chosen from lithium bis(trifluoromethanesulfonyl)imide (LiTFSI) and its derivatives, such as lithium bis(fluorosulfonyl) imide (LiFSI) and lithium bis(pentafluoroethylsulfonyl) imide (LiBETI);
   c) the solvent of the liquid electrolyte has at least 80% by volume of a solvent chosen from cyclic alkyl carbonates, chosen from ethylene carbonate (EC) and propylene carbonate (PC), acyclic alkyl carbonates, chosen from dimethyl carbonate (DMC), diethyl carbonate (DEC) and methyl isopropyl carbonate (MiPC), lactones, esters, oxalanes and their mixtures, it being understood that said solvent comprises at least 20% by volume of ethylene carbonate;
   d) the porous carbon-based material of the positive electrode is chosen from materials in which the mean dimension of the pores is greater than 0.7 nm and which have a specific surface of greater than 700 $m^2/g$ approximately (B.E.T. method);
   e) the nonporous carbon-based material of the negative electrode is chosen from materials which are capable of inserting the lithium ions and which have a specific surface of less than or equal to 150 $m^2/g$;
   f) after the assembling stage, the charging of said hybrid supercapacitor is carried out in several successive charging stages up to a maximum voltage ($U_{max}$) of between 4 and 5 volts and at a current density varying from 10 mA/g to 400 mA/g, each charging stage being separated from the following charging stage by an intermediate stage of self-discharging or discharging at a current density of less than 5 mA/g.

2. The process as claimed in claim 1, wherein the concentration of ionic lithium in the liquid electrolyte before the formation cycle is greater than or equal to 2.0 mol/l.

3. The process as claimed in claim 1, wherein the liquid electrolyte is chosen from the following lithium salt/solvent (s) pairs:
   i) LiTFSI-EC/DMC (1/1; v/v) mixture;
   ii) LiFSI-EC/DMC (1/1; v/v) mixture;
   iii) LiBETI-EC/DMC (1/1 v/v) mixture;
   iv) LiTFSI-EC/EB/DMC (1/1/3; v/v/v) mixture;
   v) LiTFSI-EC/MiPC/DMC (2/1/3/; v/v/v) mixture;
   vi) LiTFSI-EC/DME (1/2; v/v) mixture.

4. The process as claimed in claim 1, wherein the liquid electrolyte additionally includes $LiPF_6$ as additional lithium salt.

5. The process as claimed in claim 4, wherein the LiPF$_6$ is present in the electrolyte in a molar amount representing at most a quarter of the molar amount of lithium salts defined in point b) of claim 1.

6. The process as claimed in claim 1, wherein the porous carbon based material of the positive electrode is chosen from carbide-derived carbon (CDC), porous carbon nanotubes, porous carbon blacks, porous carbon fibers, carbon onions and carbons resulting from coke.

7. The process as claimed in claim 1, wherein the specific surface of the porous carbon-based material of the positive electrode varies from 1200 to 1800 m$^2$/g approximately (B.E.T. method).

8. The process as claimed in claim 1, wherein the density of the porous carbon-based material of the positive electrode preferably varies from 0.5 to 0.8 g/cm$^3$.

9. The process as claimed in claim 1, wherein the content of oxygen in the porous carbon-based material of the positive electrode is less than 2% by weight.

10. The process as claimed in claim 1, wherein the positive electrode has a thickness varying from 70 to 120 µm.

11. The process as claimed in claim 1, wherein the nonporous carbon-based material of the negative electrode is chosen from graphite, low-temperature carbon, carbon black, nonporous carbon nanotubes and nonporous carbon fibers.

12. The process as claimed in claim 1, wherein the density of the nonporous carbon-based material of the negative electrode varies from 1.0 to 1.9 g/cm$^3$.

13. The process as claimed in claim 1, wherein the specific surface of the nonporous carbon-based material of the negative electrode is less than 50 m$^2$/g.

14. The process as claimed in claim 1, wherein the negative electrode has a thickness varying from 40 to 70 µm.

15. The process as claimed in claim 1, wherein the ratio $M_{E+}/M_{E-}$ is preferably greater than or equal to 1.

16. The process as claimed in claim 15, wherein the ratio $M_{E+}/M_{E-}$ varies from 1 to 5 inclusive.

17. The process as claimed in claim 1, wherein the material of the positive and/or negative electrodes additionally has at least one binder and optionally at least one agent conferring an electron conductivity.

18. The process as claimed in claim 1, wherein said process is carried out at ambient temperature or at a temperature of between 25° C. and 70° C.

19. The process as claimed in claim 1, wherein the duration of the relaxation stages between each of the successive charging stages of stage f) varies from 1 to 3 hours.

20. The process as claimed in claim 1, wherein the intermediate relaxation stages described in stage f) are self-discharges.

21. The process as claimed in claim 20, wherein stage f) further comprises the following substages:
1) a substage 1 of charging at a current density of between 10 and 400 mA/g up to a voltage $U_{max1}$ of between 4.0 V and 5 V inclusive, followed by a relaxation period with a minimum duration of 1 hour;
2) a substage 2 of charging at a current density of between 10 and 400 mA/g up to a voltage $U_{max2} > U_{max1}$ and ≤5 V, followed by a relaxation period with a minimum duration of 1 hour;
3) a substage 3 of charging at a current density of between 10 and 400 mA/g up to a voltage $U_{max3} > U_{max2}$ and ≤5 V, followed by a relaxation period with a minimum duration of 1 hour,
4) a substage 4 of charging at a current density of between 10 and 400 mA/g up to a voltage $U_{max4} > U_{max3}$ and ≤5 V, followed by a relaxation period with a minimum duration of 1 hour,
5) a substage 5 of charging at a current density of between 10 et 400 mA/g up to a voltage $U_{max5} > U_{max4}$ and ≤5 V, followed by a relaxation period with a minimum duration of 1 hour.

* * * * *